(12) United States Patent
Benard et al.

(10) Patent No.: US 11,694,669 B2
(45) Date of Patent: Jul. 4, 2023

(54) METHOD FOR MANUFACTURING A CELLULAR CORE FOR AN ACOUSTIC PANEL

(71) Applicant: Safran Nacelles, Gonfreville l'Orcher (FR)

(72) Inventors: Quentin Alban Guillaume Benard, Moissy Cramayel (FR); Virginie Emmanuelle Anne Marie Digeos, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 480 days.

(21) Appl. No.: 16/811,527

(22) Filed: Mar. 6, 2020

(65) Prior Publication Data

US 2020/0276641 A1 Sep. 3, 2020

Related U.S. Application Data

(63) Continuation of application No. PCT/FR2018/052159, filed on Sep. 4, 2018.

(30) Foreign Application Priority Data

Sep. 6, 2017 (FR) ...................... 1758216

(51) Int. Cl.
*B33Y 80/00* (2015.01)
*B64D 33/02* (2006.01)
(Continued)

(52) U.S. Cl.
CPC ............ *G10K 11/172* (2013.01); *B22F 3/225* (2013.01); *B22F 10/20* (2021.01);
(Continued)

(58) Field of Classification Search
CPC .......... B22F 10/20; B22F 3/225; B33Y 80/00; B33Y 10/00; B29C 45/4407; B64D 15/04;
(Continued)

(56) References Cited

U.S. PATENT DOCUMENTS

| 4,688,757 A | 8/1987 | Cook et al. |
| 5,617,595 A | 4/1997 | Landi et al. |

(Continued)

FOREIGN PATENT DOCUMENTS

| EP | 2244939 | 11/2010 |
| EP | 2537754 | 12/2012 |

(Continued)

OTHER PUBLICATIONS

International Search Report for International Application PCT/FR2018/052159, dated Nov. 26, 2018.

(Continued)

*Primary Examiner* — Craig M Schneider
*Assistant Examiner* — David R Deal
(74) *Attorney, Agent, or Firm* — Burris Law, PLLC

(57) ABSTRACT

A method for manufacturing a cellular core for an acoustic panel is provided. The cellular core includes at least one plurality of acoustic cells and a plurality of de-icing channels that extend longitudinally, each de-icing channel being transversely interposed between two successive cells, and the de-icing channels being adapted to channel a de-icing fluid. A manufacturing step includes producing the acoustic cells and the de-icing channels as a single piece such that the cellular core manufactured during the manufacturing step forms a monolithic part.

13 Claims, 2 Drawing Sheets

(51) Int. Cl.
*F02C 7/045* (2006.01)
*F02C 7/047* (2006.01)
*G10K 11/172* (2006.01)
*B22F 3/22* (2006.01)
*B29C 45/44* (2006.01)
*B64D 15/04* (2006.01)
*G10K 11/162* (2006.01)
*B22F 10/20* (2021.01)
*B33Y 10/00* (2015.01)
*B29K 71/00* (2006.01)
*B29K 81/00* (2006.01)

(52) U.S. Cl.
CPC .......... *B29C 45/4407* (2013.01); *B33Y 80/00* (2014.12); *B64D 15/04* (2013.01); *B64D 33/02* (2013.01); *F02C 7/045* (2013.01); *F02C 7/047* (2013.01); *G10K 11/162* (2013.01); *B29K 2071/00* (2013.01); *B29K 2081/04* (2013.01); *B33Y 10/00* (2014.12); *B64D 2033/0206* (2013.01); *B64D 2033/0233* (2013.01); *F05D 2230/54* (2013.01); *F05D 2260/963* (2013.01)

(58) Field of Classification Search
CPC ............ B64D 33/02; B64D 2033/0206; B64D 2033/0233; F02C 7/047; G10K 11/162; B29K 2071/00; B29K 2081/04; F05D 2230/54; F05D 2260/963
See application file for complete search history.

(56) References Cited

U.S. PATENT DOCUMENTS

| | | | |
|---|---|---|---|
| 5,785,919 A * | 7/1998 | Wilson | B32B 3/12 |
| | | | 264/250 |
| 9,221,230 B2 | 12/2015 | Dean et al. | |
| 9,764,539 B2 | 9/2017 | Dean et al. | |
| 2006/0018752 A1 * | 1/2006 | LeMieux | F01D 11/00 |
| | | | 416/96 R |
| 2008/0179448 A1 | 7/2008 | Layland et al. | |
| 2013/0000247 A1 * | 1/2013 | Sypeck | B32B 3/12 |
| | | | 29/897.31 |
| 2014/0216846 A1 | 8/2014 | Hurlin et al. | |
| 2016/0032762 A1 * | 2/2016 | Goman | F01D 25/02 |
| | | | 415/185 |
| 2017/0096230 A1 * | 4/2017 | Surply | F02C 7/045 |
| 2018/0250775 A1 * | 9/2018 | Spink | B23K 26/34 |
| 2018/0372556 A1 * | 12/2018 | Parsons | G01K 1/08 |
| 2019/0152168 A1 * | 5/2019 | Tobin | B29C 70/386 |
| 2019/0153994 A1 * | 5/2019 | Tobin | B33Y 80/00 |
| 2020/0122844 A1 * | 4/2020 | Porte | B64D 29/00 |
| 2020/0276641 A1 * | 9/2020 | Benard | B64D 15/04 |

FOREIGN PATENT DOCUMENTS

| | | |
|---|---|---|
| EP | 2604426 | 6/2013 |
| FR | 3041937 | 4/2017 |
| WO | 2008104714 | 9/2008 |
| WO | 2009081020 | 7/2009 |
| WO | 2017137740 | 8/2017 |

OTHER PUBLICATIONS

Search report issued in Russian counterpart Application No. 2020112622 by the Russian Patent Office dated Jan. 26, 2022.
Brassard, et al., 3D Thermoplastic Elastomer Microfluidic Devices for Biological Probe Immobilization, Lab Chip, Oct. 31, 2011, pp. 4099-4107, vol. 11, The Royal Society of Chemistry.

\* cited by examiner

METHOD FOR MANUFACTURING A CELLULAR CORE FOR AN ACOUSTIC PANEL

CROSS-REFERENCE TO RELATED APPLICATIONS

This application is a continuation of International Application No. PCT/FR2018/052159, filed on Sep. 4, 2018, which claims priority to and the benefit of FR 17/58216 filed on Sep. 6, 2017. The disclosures of the above applications are incorporated herein by reference.

FIELD

The present disclosure relates to a method for manufacturing a cellular core for an acoustic panel.

BACKGROUND

The statements in this section merely provide background information related to the present disclosure and may not constitute prior art.

An aircraft is propelled by one or several propulsion unit(s) each comprising a turbojet engine/turboprop housed within a tubular nacelle. Each propulsion unit is attached to the aircraft by a pylon generally located below a wing or at the level of the fuselage.

A nacelle generally has a structure comprising an air inlet upstream of the engine, a middle section intended to surround a fan of the turbojet engine, a downstream section accommodating thrust reversal means and intended to surround the combustion chamber of the turbojet engine, and generally terminates in an ejection nozzle whose outlet is located downstream of the turbojet engine.

The air inlet comprises, on the one hand, an air inlet lip adapted to enable the optimum collection towards the turbojet engine of air desired for feeding the fan and the inner compressors of the turbojet engine, and on the other hand, a downstream structure on which the lip is affixed and intended to channel air towards the blades of the fan. The set is attached upstream of a casing of the fan belonging to the upstream section of the nacelle.

In flight, depending on the temperature and humidity conditions, ice may form on the nacelle, in particular at the level of the outer surface of the air inlet lip. The presence of ice or frost modifies the aerodynamic properties of the air inlet and disturbs the channeling of air towards the fan. In addition, the formation of frost on the air inlet of the nacelle and the ingestion of ice by the engine in case of detachment of ice blocks may damage the engine, and threaten the safety of the flight.

A solution for deicing the outer surface of the air inlet lip consists in avoiding that ice forms on this outer surface by maintaining the concerned surface at a sufficient temperature.

Thus, it is known, for example from the U.S. Pat. No. 4,688,757, to collect hot air at the level of the compressor of the turbojet engine and to bring it at the level of the air inlet lip in order to heat up the outer surface of the lip.

Also, it is known to equip the air inlet lip of the nacelle with an acoustic panel adapted to absorb a portion of the noise emitted from the inside of the nacelle towards the outside of the nacelle.

Typically, the acoustic panel comprises a perforated acoustic skin which is arranged opposite the air inlet flow path of the nacelle and a cellular core which is assembled on the acoustic skin.

The cellular core comprises a plurality of acoustic cells, forming Helmholtz resonators, which are separated from one another by peripheral partition walls.

The acoustic cells extend across the thickness from a front end bearing on the acoustic skin, up to a rear end sealed by a rear face.

The cellular core is generally made flat and has a high mechanical resistance to compression and to bending, which makes the forming of the acoustic panel difficult, in particular to form the acoustic panel according to the geometry of an air inlet lip of a nacelle.

The document WO 2009/081020 describes and represents a structure for acoustic treatment which integrates both an acoustic treatment and a deicing treatment.

According to this document, the structure comprises an acoustic skin, a cellular core comprising strips of cells, a reflective skin and a plurality of channels which are interposed between the cells and which are intended to channel the hot air of a deicing system.

It should be noted that the channels and the strips of cells form distinct subassemblies which are manufactured independently and which are assembled together.

The manufacture of such a structure turns out to be time-consuming and expensive.

In addition, the strips of cells that form the cellular core do not seem to have a high mechanical strength, the cellular core therefore barely contributes to the mechanical strength of the air inlet lip.

SUMMARY

This section provides a general summary of the disclosure and is not a comprehensive disclosure of its full scope or all of its features.

The present disclosure relates to a method for manufacturing a cellular core for an acoustic panel, the cellular core comprising at least:

a plurality of acoustic cells each being delimited by peripheral longitudinal partition walls and by peripheral transverse partition walls, the acoustic cells extending vertically across the thickness from an open front end intended to bear vertical on an acoustic skin, up to a rear end sealed by a rear face, and a plurality of deicing channels which extend longitudinally, each deicing channel being interposed transversely between two successive cells, the deicing channels being adapted to channel a deicing fluid, characterized in that it comprises a manufacturing step which consists in making the acoustic cells and the deicing channels integrally in one-piece, the cellular core thus manufactured during the manufacturing step forming an integral part.

An integral cellular core can offer a high mechanical strength, or conversely the integral cellular core can be flexible so as to conform to a complex shape, depending on the material used for the manufacture thereof and depending on needs.

In addition, the present disclosure allows making simultaneously, in one single manufacturing step, both the channels and the cells of the cellular core, in order to reduce the manufacturing cycle of an acoustic panel.

According to a first form of the present disclosure, each deicing channel extends longitudinally from a front end of the longitudinal partition walls of the cells.

According to this first form, the manufacturing step is an additive manufacturing step.

According to a second form, each deicing channel is interposed between a first longitudinal partition wall of a first acoustic cell and a second longitudinal partition wall of a second acoustic cell, said acoustic cells being directly adjacent, the acoustic cells and the deicing channels being designed without any undercut face.

This feature allows making the cellular core by molding in one single manufacturing step.

According to a third form, each deicing channel is delimited by a rear face which is flush with the rear face of the acoustic cells.

This feature allows facilitating the demolding of the cellular core.

According to the second and third forms, the manufacturing step is a step of manufacturing by molding.

According to another feature, the manufacturing step is a step of manufacturing by deformation of a sheet metal.

According to another feature, the material used for the manufacture of the cellular core during the manufacturing step is a substantially elastically-deformable material adapted to facilitate demolding and to enable the cellular core to conform to complex shapes.

According to another feature, the manufacturing step consists in making the cellular core shaped as a sector of a rotationally-symmetric part.

This feature allows obtaining the final shape of the cellular core and allows getting rid of a step of forming the cellular core.

According to another feature, the method comprises an assembly step which consists in assembling the cellular core on a front acoustic skin, to form an acoustic panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
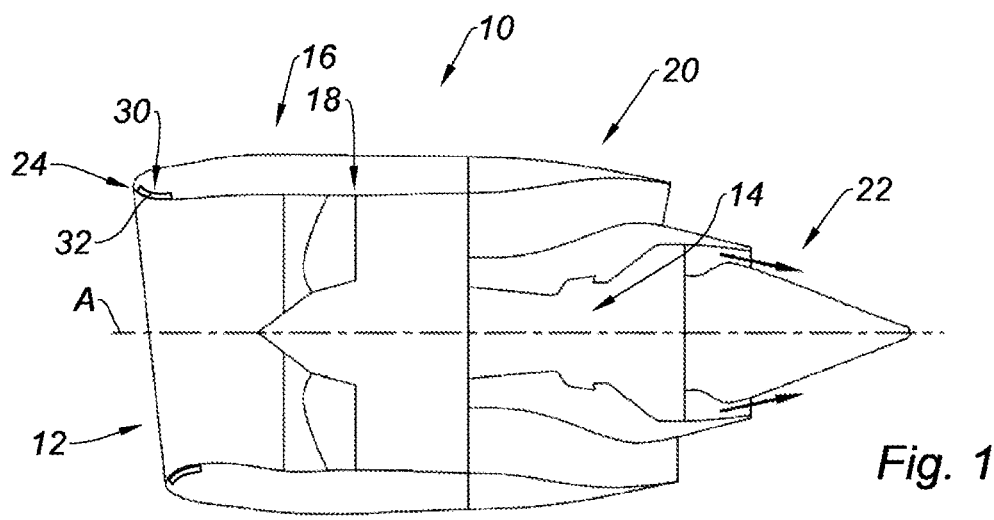
FIG. 1 is a schematic longitudinal sectional view, which illustrates a turbojet engine nacelle comprising an air inlet lip equipped with an acoustic panel made according to the manufacturing method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 4:
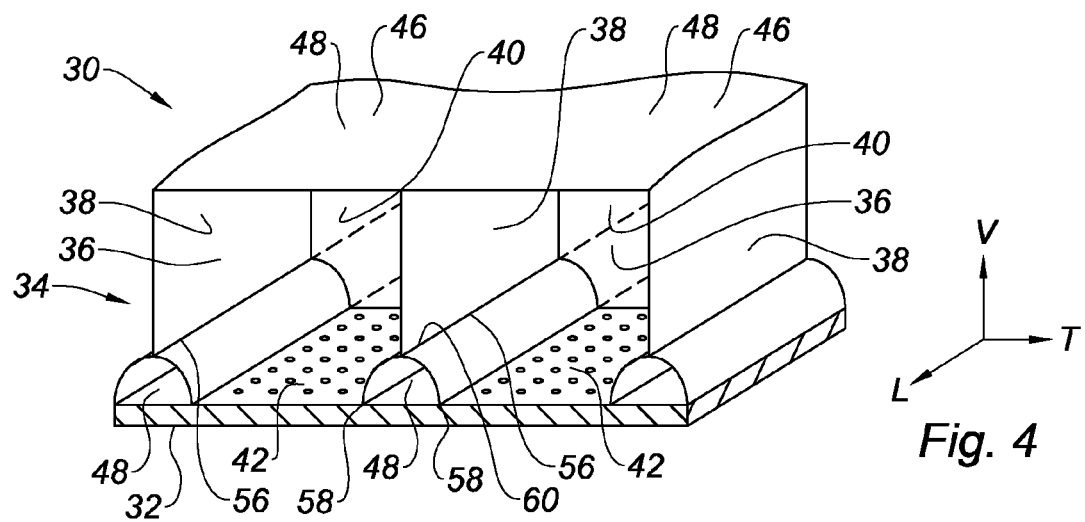
FIG. 4 is a schematic sectional and perspective view which illustrates a portion of the acoustic panel of FIG. 1 according to a first form of the present disclosure.
Figure 5:
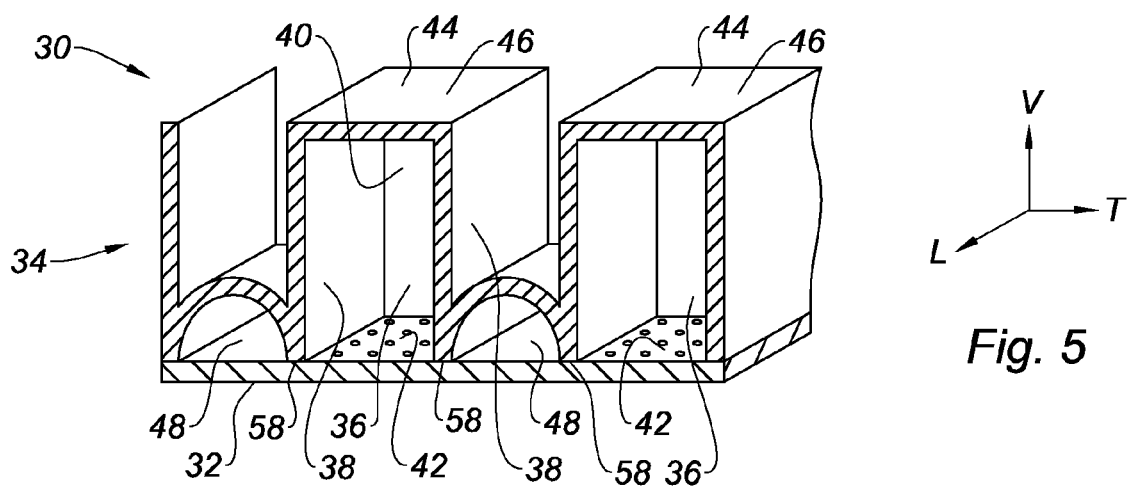
FIG. 5 is a schematic sectional and perspective view which illustrates a portion of the acoustic panel of FIG. 1 according to a second form of the present disclosure.
Figure 6:
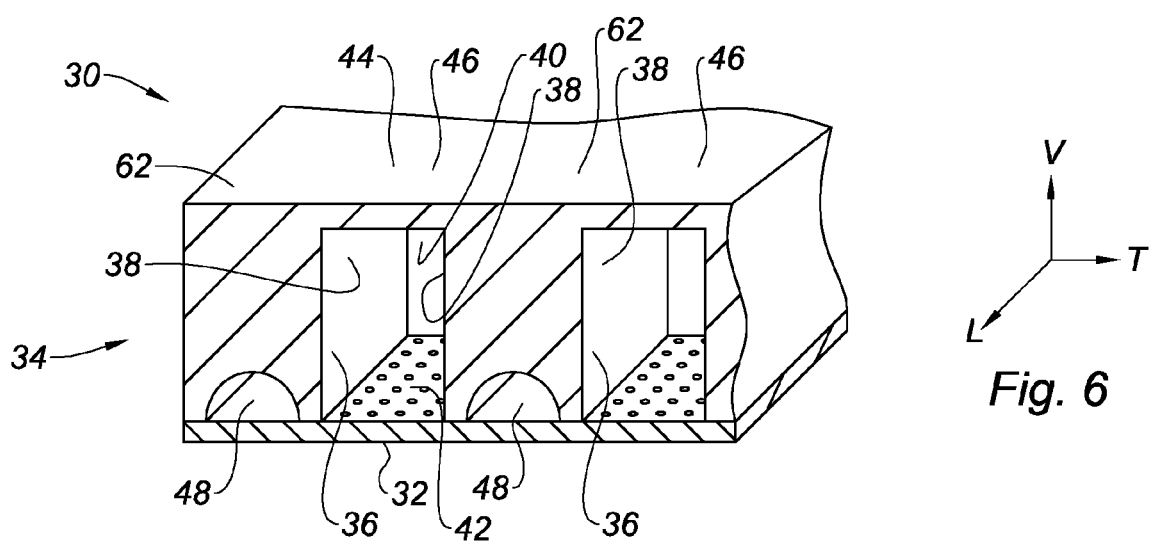
FIG. 6 is a schematic sectional and perspective view which illustrates a portion of the acoustic panel of FIG. 1 according to a third form of the present disclosure.

In the description and the claims, the expressions "front" and "rear" will be used in a non-limiting manner respectively with reference to the lower portion and to the upper portion of FIGS. 4 to 6.

In addition, in order to clarify the description and the claims, the terminology longitudinal, vertical and transverse will be adopted locally and in a non-limiting manner with reference to the trihedron L, V, T indicated in FIGS. 4 to 6, whose axis L is parallel to the axis A of the nacelle.

It should be noted that the vertical axis V extends generally radially with respect to the longitudinal axis A of the nacelle and the transverse axis T extends generally tangentially with respect to the longitudinal axis A of the nacelle.

In addition, in order to facilitate the understanding of the description, the acoustic panel portions illustrated in FIGS. 4 to 6 are represented planar, without taking into account the radius of curvature of the acoustic panel in its entirety.

In all of these figures, identical or similar reference numerals represent identical or similar members or sets of members.

In FIG. 1, there is represented a nacelle 10 with a generally annular shape which extends around a longitudinal axis A.

The nacelle 10 comprises an air inlet 12 upstream of the engine 14, a middle section 16 intended to surround a fan 18 of the turbojet engine, a downstream section 20 accommodating thrust reversal means and intended to surround the combustion chamber of the turbojet engine, and an ejection nozzle 22 whose outlet is located downstream of the turbojet engine.

Figure 2:
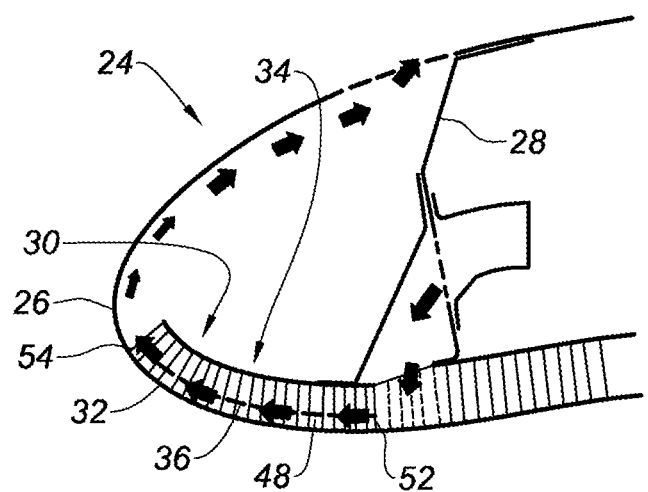
FIG. 2 is a schematic detail longitudinal sectional view, which illustrates the acoustic panel of FIG. 1 integrated into the air inlet lip.

As shown in FIG. 2, the air inlet 12 comprises an air inlet lip 24 which forms an annular shaped volume around the axis A of the nacelle 10, having a "D" shaped section.

The air inlet lip 24 is delimited by an upstream outer wall 26 to be deiced, forming a leading edge, and a downstream partition wall 28 which separates the volume delimited by the air inlet lip 24 and the section of the nacelle 10 that is connected on the lip 24.

The lip 24 is equipped with an acoustic panel 30 which comprises a perforated front acoustic skin 32 which forms a portion of the outer wall 26 of the lip 24 and a cellular core 34.

Referring to FIG. 4, the cellular core 34 comprises a plurality of acoustic cells 36 which are bonded to one another and which are arranged in a checkerboard-like fashion.

Each of the cells 36 has a generally parallelepiped shape and each is delimited by two peripheral longitudinal partition walls 38 facing each other and by two peripheral transverse partition walls 40 facing each other.

Also, the acoustic cells 36 extend vertically, or radially, across the thickness from an open front end 42 which bears vertical on the acoustic skin 32, up to a rear end 44 sealed by a rear face 46 of the associated cell 36.

In order to allow channeling a deicing fluid, such as hot air for example, the cellular core 34 comprises a plurality of deicing channels 48 which extend longitudinally.

Each deicing channel 48 is interposed transversely between two successive cells 36.

As shown in FIG. 2, each channel 48 has a hot air inlet 52 which is connected to a hot air source, in the vicinity of the partition wall 28 of the lip, and a hot air outlet 54 which opens in the vicinity of the leading edge of the lip 24, such that the passage of the hot air through the channels heats up the outer wall of the lip 24 which is arranged under the channels 48.

The circulation of the hot air in the lip 24 is illustrated by arrows in FIG. 2.

The manufacturing method according to the present disclosure comprises a manufacturing step which comprises in making the acoustic cells 36 and the deicing channels 48 integrally in one-piece, the cellular core 34 thus manufactured during the manufacturing step forming an integral part.

According to a first form of the present disclosure illustrated in FIG. 4, each deicing channel 48 extends longitudinally from a front end 56 of the longitudinal partition walls 38 of the cells 36, each channel 48 connecting all of the longitudinal partition walls 38 which are aligned so as to form a row.

Each channel 48 has a half-circle like cross-section, which has two longitudinal edges 58 bearing on the acoustic skin 32 and a convex central portion 60 from which extends the longitudinal partition wall 38 of the associated cell 36.

In a non-limiting manner, the cross-section of the channels 48 may have a triangular shape to facilitate an additive-type manufacture.

According to this first form, the step of manufacturing the cellular core 34 is a step of additive manufacturing by material addition. For example, the cellular core 34 is made of an aluminum alloy.

The additive manufacture is also known by the expression "three-dimensional printing" or "3D printing".

The additive manufacturing step allows making integrally in one-piece the cellular core 34 which comprises the cells 36 formed by the partition walls 38, 40 and by the rear face 46, and the channels 48.

Figure 3:
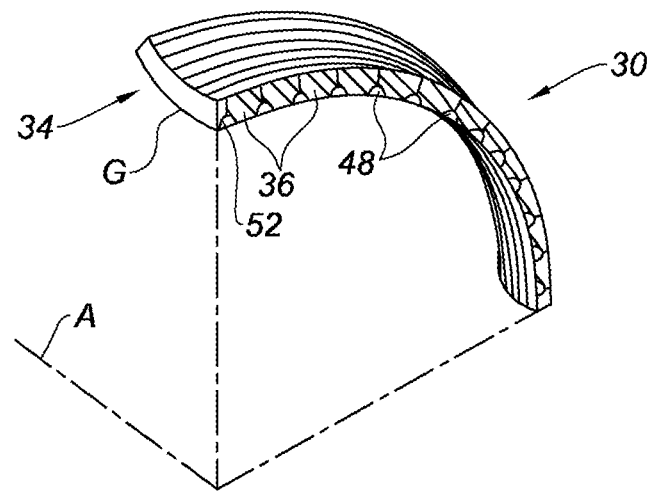
FIG. 3 is a schematic detail perspective view which illustrates the acoustic panel of FIG. 1 forming an angular sector.

Referring to FIG. 3, the integral cellular core 34 obtained following the manufacturing step is shaped as a sector of a rotationally-symmetric part about the axis A of the nacelle 10, whose generatrix G illustrated in FIG. 3, shaped as a curved rectangle, conforms to the curvature of the air inlet lip 24.

Thus, the cellular core 34 perfectly conforms to the shape of the lip 24 and of the acoustic skin 32, without any additional forming step.

According to a second form of the present disclosure illustrated in FIG. 5, each deicing channel 48 extends longitudinally and is interposed between a first longitudinal partition wall 38 of a first acoustic cell 36 and a second longitudinal partition wall 38 of a second acoustic cell 36, said acoustic cells 36 being directly adjacent transversely, such that the acoustic cells 36 and the deicing channels 48 are designed without any undercut face.

By "without any undercut face", it should be understood that the rear face formed by the cells 36 and the channels 48 are adapted to enable the removal from a manufacturing mold. Similarly, the front face formed by the cells 36 and the channels 48 is adapted to enable the removal from a manufacturing mold.

Each channel 48 has a half-circle like cross-section, which has two longitudinal edges 58 bearing on the acoustic skin 32.

The two longitudinal edges 58 of each channel 48 are common to the front ends edges of the longitudinal partition walls 38 of the associated cells 36.

According to this second form, the step of manufacturing the cellular core 34 is a step of manufacturing by injection molding of a flexible polymer, the cellular core 34 being designed so as to be substantially deformed in order to conform to the curves of the air inlet lip 24 and to facilitate the demolding of the cellular core 34.

Thus, the cellular core 34 may be molded into a generally planar shape, to facilitate demolding.

In addition, manufacturing in a polymer enables the use of a material suited to the external environment and without any risk of galvanic coupling with another metallic part.

Still according to this second form, the cellular core 34 is made of silicone for example.

In a non-limiting manner, according to this second form, the cellular core 34 may also be made by injection molding of a metal, which method is known under the acronym MIM standing for "Metal Injection Molding".

Similarly, in a non-limiting manner, the cellular core 34 may be made of polyether ether ketone (also referred to as PEEK), or of Polyphenylene Sulfide, for example, despite the fact that these materials are not flexible.

In addition, according to this second form, the cellular core may also be made by stamping of a sheet metal.

According to a third form of the present disclosure illustrated in FIG. 6, each deicing channel 48 extends longitudinally and is interposed between a first longitudinal partition wall 38 of a first acoustic cell 36 and a second longitudinal partition wall 38 of a second acoustic cell 36, said acoustic cells 36 being directly adjacent transversely.

In addition, according to this third form, each deicing channel 48 is delimited by a rear face 62 which is flush with the rear face 46 of the acoustic cells 36.

Thus, the rear face of the cellular core 34 is generally planar, which facilitates the demolding of the cellular core 34.

Also, according to the three forms described hereinabove, the material used for the manufacture of the cellular core 34 during the manufacturing step is a material which is adapted to withstand a high temperature in order to withstand the passage of the hot air, for example a temperature close to 180 degrees Celsius.

In addition, the method for manufacturing the cellular core comprises an assembly step, which is common to the three previously-described forms and which consists in assembling the cellular core 34 on the acoustic skin 32, to form the acoustic panel 30.

For example, the assembly step is carried out by gluing, by soldering or by welding, depending on the material used to make the cellular core 34.

The present description of the present disclosure is provided as a non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for manufacturing an acoustic panel, the method comprising:

manufacturing a cellular core having a front end surface and a rear end surface defining a thickness direction, the cellular core further comprising peripheral longitudinal partition walls disposed between the front end surface and the rear end surface and extending in a longitudinal direction of the cellular core, a plurality of recesses recessed from the front end surface and being open at the front end surface, peripheral transverse partition walls extending in a transverse direction vertical to the longitudinal direction and connected to the peripheral longitudinal partition walls, wherein the cellular core is integrally formed in one-piece; and attaching a front acoustic skin to the front end surface of the cellular core to close the plurality of recesses at the front end surface in the thickness direction such that some of the recesses form a plurality of acoustic cells and a remainder of the recesses form a plurality of deicing channels, and such that the plurality of acoustic cells and the de-icing channels extend in the longitudinal direction, wherein each deicing channel is interposed between two successive acoustic cells, and the plurality of deicing channels being adapted to channel a deicing fluid.

2. The method according to claim 1, wherein each deicing channel extends longitudinally from a front end of the peripheral longitudinal partition walls of the plurality of acoustic cells.

3. The method according to claim 2, wherein the manufacturing step is an additive manufacturing step.

4. The method according to claim 1, wherein each deicing channel is interposed between a first peripheral longitudinal partition wall of a first acoustic cell and a second peripheral longitudinal partition wall of a second acoustic cell, the first and second acoustic cells being directly adjacent, wherein the plurality of acoustic cells and the plurality of deicing channels are designed without any undercut face such that the rear end surface of the cellular core is formed by a rear face of the plurality of acoustic cells and the plurality of deicing channels and is adapted to enable removal of a manufacturing mold.

5. The method according to claim 4, wherein the manufacturing step is a step of manufacturing by molding.

6. The method according to claim 4, wherein the manufacturing step is a step of manufacturing by deformation of a sheet metal.

7. The method according to claim 1, wherein each deicing channel is delimited by a rear face which is flush with a rear face of the plurality of acoustic cells.

8. The method according to claim 1, wherein material used for manufacturing the cellular core during the manufacturing step is a substantially elastically-deformable material adapted to facilitate demolding and to enable the cellular core to conform to complex shapes.

9. The method according to claim 1, wherein the manufacturing step consists of making the cellular core shaped as a sector of a rotationally-symmetric part.

10. The method according to claim 1, wherein the peripheral longitudinal partition walls each define a front end and a rear end along the thickness direction, the plurality of deicing channels being disposed at the front ends of the peripheral longitudinal partition walls.

11. The method according to claim 1, wherein the plurality of acoustic cells are parallel to the plurality of deicing channels.

12. The method according to claim 1, wherein each of the deicing channels is delimited by a rear face, which defines a step with a rear face of the plurality of acoustic cells.

13. The method according to claim 12, wherein the rear face of each of the deicing channels is a curved outer surface.

* * * * *